US008234367B2

(12) United States Patent
Papierniak et al.

(10) Patent No.: US 8,234,367 B2
(45) Date of Patent: Jul. 31, 2012

(54) TECHNIQUES FOR HIERARCHICAL REPORT TOOL SESSION MANAGEMENT

(75) Inventors: Karen Papierniak, Fenton, MI (US); Dennis Jeng, Yorba Linda, CA (US); Jonathan Hugh Tebay, Tonbridge (GB)

(73) Assignee: Teradata US, Inc., Dayton, OH (US)

( * ) Notice: Subject to any disclaimer, the term of this patent is extended or adjusted under 35 U.S.C. 154(b) by 285 days.

(21) Appl. No.: 12/237,907

(22) Filed: Sep. 25, 2008

(65) Prior Publication Data
US 2010/0077074 A1 Mar. 25, 2010

(51) Int. Cl.
*G06F 15/173* (2006.01)
(52) U.S. Cl. ............... 709/224; 709/227; 714/15
(58) Field of Classification Search .......... 709/224, 709/227; 714/15
See application file for complete search history.

(56) References Cited

U.S. PATENT DOCUMENTS

| | | | |
|---|---|---|---|
| 5,918,014 A * | 6/1999 | Robinson ............... 709/219 |
| 6,385,642 B1 | 5/2002 | Chlan et al. |
| 6,662,310 B2 * | 12/2003 | Lopez et al. ............ 714/15 |
| 6,862,689 B2 | 3/2005 | Bergsten et al. |
| 6,978,298 B1 | 12/2005 | Kuehr-McLaren |
| 7,574,591 B2 * | 8/2009 | Downer et al. .......... 713/1 |
| 2001/0047477 A1 | 11/2001 | Chiang |
| 2003/0204439 A1 * | 10/2003 | Cullen, III ............ 705/11 |
| 2006/0075120 A1 * | 4/2006 | Smit .................. 709/227 |
| 2006/0212589 A1 | 9/2006 | Hayer et al. |
| 2007/0133953 A1 * | 6/2007 | Fontijn et al. .......... 386/126 |
| 2007/0169185 A1 | 7/2007 | Readshaw |
| 2007/0220155 A1 | 9/2007 | Nalla et al. |
| 2009/0222735 A1 * | 9/2009 | Clark et al. ........... 715/738 |

OTHER PUBLICATIONS

"What's New 2.6", http://xinvest.sunsite.dk/ChangeLog.xinvest, (Feb. 5, 2000).

* cited by examiner

*Primary Examiner* — Thomas Dailey
(74) *Attorney, Agent, or Firm* — Schwegman Lundberg & Woessner

(57) ABSTRACT

Techniques are presented for hierarchical report tool session management. A user interacts with a hierarchical reporting tool during a first session and reaches a specific nested level within the tool for a particular hierarchy being accessed by the user. At some point in time the user exits the tool (normally or abnormally). The specific nested level is maintained on behalf of the user. So, when the user initiates a second and subsequent session with the tool, the user is presented with the specific nested level when the tool is started for that subsequent session.

12 Claims, 9 Drawing Sheets

FIG. 4C

Review Report - Time Drill Down to Month 2005

| Time | Location | Product |
|---|---|---|
| All | All | All |

| Time | SKU ID | Desc | O/S € (at cost) | O/S Units | Sales € | Sales Profit € | Sales % | C/S € (at cost) | C/S Units |
|---|---|---|---|---|---|---|---|---|---|
| All | | | 100,000.00 | 5000 | 4,000,000.00 | 3,900,000.00 | 80 | 1,250.00 | 63 |
| 2005▲ | | | 50,000.00 | 2500 | 2,000,000.00 | 1,950,000.00 | 80 | 625.00 | 31 |
| Jan-05 | | | 4,166.67 | 208 | 166,666.67 | 162,500.00 | 6.67 | 52.08 | 3 |
| Feb-05 | | | 4,166.67 | 208 | 166,666.67 | 162,500.00 | 6.67 | 52.08 | 3 |
| Mar-05 | | | 4,166.67 | 208 | 166,666.67 | 162,500.00 | 6.67 | 52.08 | 3 |
| Apr-05 | | | 173.61 | 9 | 6,944.44 | 6,770.83 | 0.28 | 2.17 | 0 |
| May-05 | | | 173.61 | 9 | 6,944.44 | 6,770.83 | 0.28 | 2.17 | 0 |
| Jun-05 | | | 7.23 | 0 | 289.35 | 282.12 | 0.01 | 0.09 | 0 |
| Jul-05 | | | 7.23 | 0 | 289.35 | 282.12 | 0.01 | 0.09 | 0 |
| Aug-05 | | | 0.30 | 0 | 12.06 | 11.75 | 0.00 | 0.00 | 0 |
| Sep-05 | | | 0.30 | 0 | 12.06 | 11.75 | 0.00 | 0.00 | 0 |
| Oct-05 | | | 0.01 | 0 | 0.50 | 0.49 | 0.00 | 0.00 | 0 |
| Nov-05 | | | 0.01 | 0 | 0.50 | 0.49 | 0.00 | 0.00 | 0 |
| Dec-05 | | | 0.00 | 0 | 0.02 | 0.02 | 0.00 | 0.00 | 0 |
| 2006▲ | | | 25,000.00 | 1250 | 1,000,000.00 | 975,000.00 | 40 | 312.50 | 16 |
| Jan-06 | | | 2,083.33 | 104 | 83,333.33 | 81,250.00 | 3.33 | 1.5 | 1 |

FIG. 4D

Review Report - Product Drill Down to Category

| Time | Location | Product | SKU ID | Desc | O/S € (at cost) | O/S Units | Sales € | Sales Profit € | Sales % | C/S € (at cost) | C/S Units |
|---|---|---|---|---|---|---|---|---|---|---|---|
| All | All | All | | | 100,000.00 | 5000 | 4,000,000.00 | 3,900,000.00 | 80 | 1,250.00 | 63 |
| 2005▲ | | | | | 50,000.00 | 2500 | 2,000,000.00 | 1,950,000.00 | 80 | 625.00 | 31 |
| Jan-05 | | Childrens▲ | | | 4,166.67 | 17 | 166,666.67 | 162,500.00 | 6.67 | 52.08 | 3 |
| Jan-05 | | Mens▲ | | | 347.22 | 1 | 13,888.89 | 13,541.67 | 0.56 | 4.34 | 0 |
| Jan-05 | | Womens▲ | | | 28.94 | 0 | 1,157.41 | 1,128.47 | 0.05 | 0.36 | 0 |
| Jan-05 | | | | | 2.41 | 208 | 96.45 | 94.04 | 0.00 | 0.03 | 0 |
| Feb-05 | | | | | 4,166.67 | 208 | 166,666.67 | 162,500.00 | 6.67 | 52.08 | 3 |
| Mar-05 | | | | | 4,166.67 | 9 | 166,666.67 | 162,500.00 | 6.67 | 52.08 | 3 |
| Apr-05 | | | | | 173.61 | 9 | 6,944.44 | 6,770.83 | 0.28 | 2.17 | 0 |
| May-05 | | | | | 173.61 | 0 | 6,944.44 | 6,770.83 | 0.28 | 2.17 | 0 |
| Jun-05 | | | | | 7.23 | 0 | 289.35 | 282.12 | 0.01 | 0.09 | 0 |
| Jul-05 | | | | | 7.23 | 0 | 289.35 | 282.12 | 0.01 | 0.09 | 0 |
| Aug-05 | | | | | 0.30 | 0 | 12.06 | 11.75 | 0.00 | 0.00 | 0 |
| Sep-05 | | | | | 0.30 | 0 | 12.06 | 11.75 | 0.00 | 0.00 | 0 |
| Oct-05 | | | | | 0.01 | 0 | 0.50 | 0.49 | 0.00 | 0.00 | 0 |
| Nov-05 | | | | | 0.01 | 0 | 0.50 | 0.49 | 0.00 | 0.00 | 0 |

Top - All | Time Drill Down - Year | Time Drill Down - Month 05 | Product Drill Down - Category | Product Drill Down - Family | Product Drill Down - SKU

FIG. 4F

| Time | Location | Product | | SKU ID | Desc | O/S € (at cost) | O/S Units | Sales € | Sales Profit € | Sales % | C/S € (at cost) | C/S Units |
|---|---|---|---|---|---|---|---|---|---|---|---|---|
| All | All | All | | | | 100,000.00 | 5000 | 4,000,000.00 | 3,900,000.00 | 80 | 1,250.00 | 63 |
| 2005▲ | | | | | | 50,000.00 | 2500 | 2,000,000.00 | 1,950,000.00 | 80 | 625.00 | 31 |
| Jan-05 | | Childrens▲ | | | | 4,166.67 | 208 | 166,666.67 | 162,500.00 | 6.67 | 52.08 | 3 |
| Jan-05 | | | Shoes | 888567768-0001 | Sandles - Brown Leather T-strap | 347.22 | 17 | 13,888.89 | 13,541.67 | 0.56 | 4.34 | 0 |
| Jan-05 | | | Shoes | 888567887-0003 | Slip-on Bright colors | 28.94 | 1 | 1,157.41 | 1,128.47 | 0.00 | 0.36 | 0 |
| Jan-05 | | | Shoes | 888567890-0003 | Water Shoes mesh soft sole | 2.41 | 0 | 96.45 | 94.04 | 0.00 | 0.03 | 0 |
| Jan-05 | | | Shoes | 888568800-0004 | Run-abouts canvas - patterns | 833.33 | 42 | 33,333.33 | 7.84 | 0.00 | 0.00 | 0 |
| Jan-05 | | | Shoes | 888568893-0005 | Run-abouts canvas - solids | 69.44 | 3 | 2,777.78 | 0.65 | 0.05 | 0.36 | 0 |
| Jan-05 | | | Boots | | | 28.94 | 1 | 1,157.41 | 1,128.47 | 0.00 | 0.03 | 0 |
| Jan-05 | | Mens▲ | | | | 2.41 | 0 | 96.45 | 94.04 | 0.00 | 0.00 | 0 |
| Jan-05 | | Womens▲ | | | | 0.00 | 0 | 8.04 | 7.84 | 0.00 | 0.00 | 0 |
| Feb-05 | | | | | | 4,166.67 | 208 | 166,666.67 | 162,500.00 | 6.67 | 52.08 | 3 |
| Mar-05 | | | | | | 4,166.67 | 208 | 166,666.67 | 162,500.00 | 6.67 | 52.08 | 3 |
| Apr-05 | | | | | | 173.61 | 9 | 6,944.44 | 6,770.83 | 0.28 | 2.17 | 0 |
| May-05 | | | | | | 173.61 | 9 | 6,944.44 | 6,770.83 | 0.28 | 2.17 | 0 |
| Jun-05 | | | | | | 173.61 | 9 | 6,944.44 | 6,770.83 | 0.28 | 2.17 | 0 |

TECHNIQUES FOR HIERARCHICAL REPORT TOOL SESSION MANAGEMENT

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example screen shots for a report tool as described below and in any drawings hereto: Copyright© 2008, Teradata, Inc. All Rights Reserved.

BACKGROUND

Reporting from an enterprise data warehouse has become the lifeblood of today's dynamic enterprises. For years now enterprises have been accumulating huge amounts of information that is now being mined from the data warehouse via reports for purposes of many enterprise functions, such as: controlling, managing, forecasting, planning, budgeting, purchasing, inventorying, marking, etc.

The Internet and the World-Wide Web (WWW) via browsers have now made interfaces to reporting tools omnipresent, such that employees, customers, managers, analysts, and the like can access the data warehouse information via WWW-enabled reporting tools from virtually any computer located anywhere around the globe.

When a user accesses a reporting tool, via a WWW browser or otherwise, that user eventually exits the reporting tool either normally or abnormally (crash of some sort) at some point in time. The user may have navigated to a beneficial spot or state within the reporting tool, which may have taken the user server minutes or more to get to.

Yet, when the user returns back to the reporting tool the previous state or location within the reporting tool is not the initial screen the user sees; rather the user must manually recreate the previous state within that reporting tool. This is time consuming and cumbersome.

Therefore, there is a need for improved techniques for managing a user's session with reporting tools accessed by that user.

SUMMARY

In various embodiments, techniques for hierarchical report tool session management are provided. In an embodiment, a reporting tool is provided to a user. Next, a nested level reached by the user within the reporting tool is recorded when the user exits the reporting tool. In addition and in some cases, filtering levels are retained as well when the user exits the reporting tool.

BRIEF DESCRIPTION OF THE DRAWINGS

FIGS. 4A-4F are illustrative screen shots of a hierarchical reporting tool used by the session management techniques presented herein.

DETAILED DESCRIPTION

Figure 1:
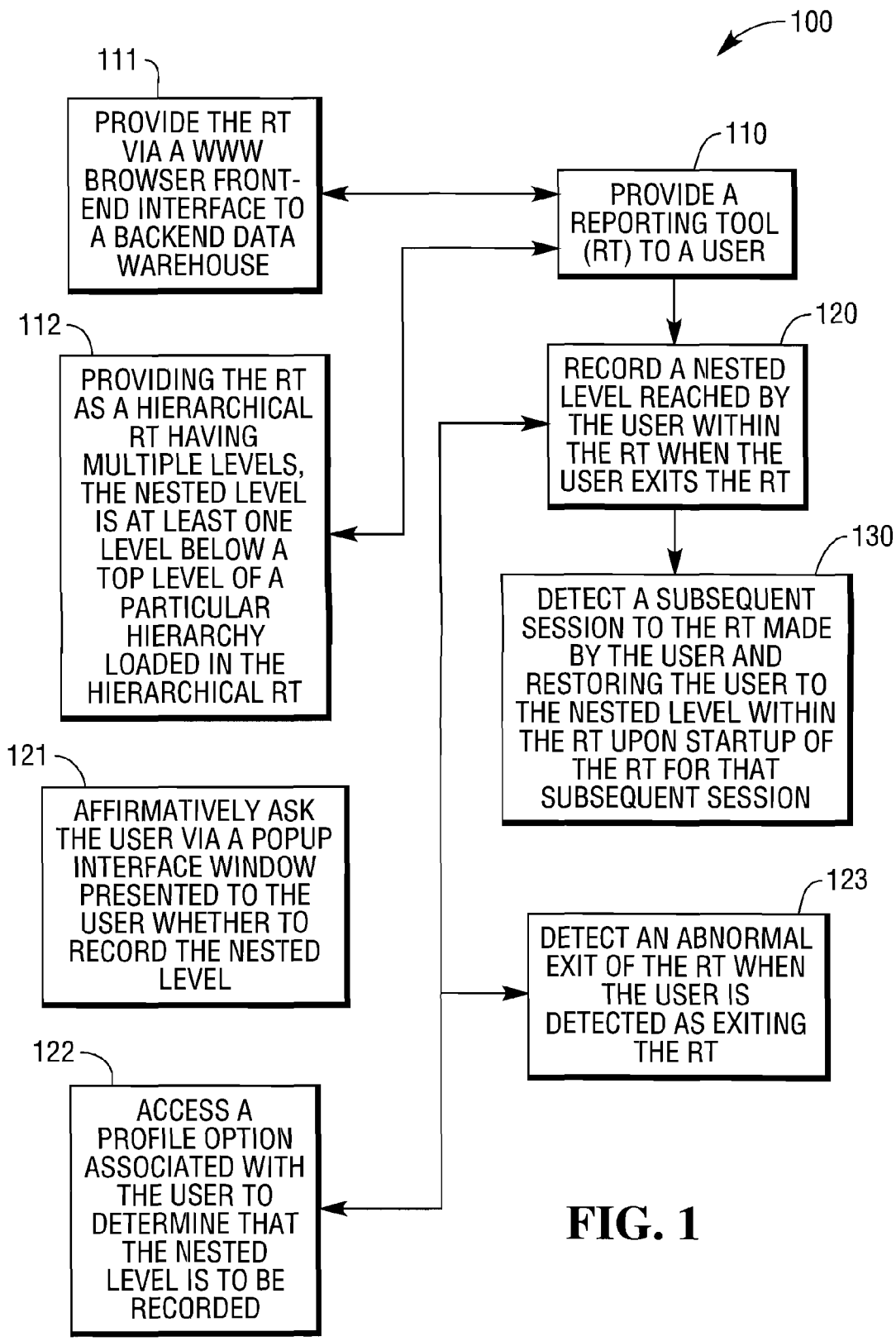
FIG. 1 is a diagram of method for session management of a hierarchical reporting tool, according to an example embodiment.

FIG. 1 is a diagram of method 100 for session management of a hierarchical reporting tool, according to an example embodiment. The method 100 (herein after "report tool session manager") is implemented in a machine-accessible and computer-readable storage medium as instructions that when processed by a machine (computer or processor-enabled device) performs the operations depicted in the FIG. 1. The report tool session manager is also operation over a network, the network is wired, wireless, or a combination of wired and wireless.

At 110, the report tool session manager provides or presents a reporting tool to a user. In an embodiment, the reporting tool is an enterprise reporting tool the presents a front-end interface to that enterprise's data warehouse. In a particular case, the reporting tool and the data warehouse along with its services is Teradata®, distributed by Teradata, Inc. Although it is to be understood that any data warehouse product or relational database can be used with embodiments presented herein.

According to an embodiment, at 111, the report tool session manager is provided via a World-Wide Web (WWW) browser as a front-end interface to a backend data warehouse that includes enterprise information indexed therein.

In another case, at 112, the report tool session manager provides the reporting tool as a hierarchical reporting tool having multiple levels. The nested level (discussed below with reference to the processing at 120) is at least one level below a top level of a particular hierarchy loaded in the hierarchical reporting tool. By hierarchical reporting tool, it is meant that various customized hierarchies for data models of the data warehouse can be loaded and traversed interactively by the user within the hierarchical reporting tool, for purposes of getting different views of the loaded hierarchy. The topmost level is a more coarse grain view of a particular report as the user traverses down a more coarse grain view or the report is presented to the user for a specific set of information that the user is after when interacting with the hierarchical reporting tool. So, the report tool session manager saves a unique nested hierarchy for each unique report that the user traverses.

At 120, the report tool session manager records a nested level reached by the user within the reporting tool when the user exits the reporting tool. That is, the user traverses a particular hierarchy for a report within the reporting tool to a nested level, at least one level below the topmost level and then the user exits the reporting tool. Exiting of the tool by the user can occur in a variety of manners and for a variety of reasons.

In an embodiment, at 121, the report tool session manager affirmatively asks the user, via a popup interface window that is presented to the user, whether the user to record the nested level. So, recordation of the nested level can be user driven in some instances.

In another case, at 122, the report tool session manager accesses a profile option that is associated with the user to determine that the nested level is to be recorded. The profile can be maintained in a variety of locations, such as the data warehouse, metadata associated with a particular user, a cookie stored on the user's client device, etc. Moreover, the profile can be specific to a particular hierarchy and user combination. In other words, a single user can have a profile were the nested level is recorded for one hierarchy and for another it is not recorded and rather always begins at a particular desired user level within the reporting tool for that other hierarchy regardless of what level the user was at when the user exits that particular other hierarchy. So, customization can be achieved based on preferences of a user or even a role associated with a user (management, group, etc.) and the customization can be done for specific hierarchies. This customization is achieved via profiles or even policies, which can be stored, retrieved, and analyzed from a variety of locations. Additionally, a profile setting can allow for the removal of all nested level recordation and shut the session management features off altogether.

At 123, the report tool session manager detects an abnormal exit of the report tool when the user is detected as having exited the report tool. Here, the user's software environment may crash, a WWW browser hosting the report tool may crash, the report tool may crash, a network connection to the report tool may be lost, a time-out policy may be reached forcing a system termination of the report tool session, etc.

It is also noted that the user can manually and normally exit the report tool. So, the exit that is detected when the user is at the nested level within the reporting tool for a particular report having a particular hierarchy can occur under normal user-initiated circumstances or under abnormal and non user-initiated circumstances. In either case, the report tool session manager detects the exit and saves the nested level. Some normal exits that may be detected include the user closing the browser manually, manually leaving a web site hosting the reporting tool, shutting down the computer, etc.

In cases where it is the reporting tool that crashes, the reporting tool can implement auto-save features of the nested level, such that as soon as the user reaches a nested level the report tool saves that nested level. In this manner, if the user is successful in reaching a particular nested level, that nested level is immediately saved, such that even if the report tool crashes the nested level is saved.

In another situation, at 130, the report tool session manager detects a subsequent session to the reporting tool (the phrases "reporting tool and "report tool" may be used interchangeably and synonymously herein) that is made by the user when the user, subsequent to the exit and a previous session, starts up the reporting tool for the subsequent session. Here, the report tool session manager restores the user to the nested level within the reporting tool, such that the user is presented with the nested level and the results of a particular report at that nested level as a first screen within the subsequent session. More details of this restoration are presented below with reference to the method 200.

Furthermore, a detailed example of what information is stored with the nested level is presented below with the discussions of the FIGS. 4A-4F.

Figure 2:
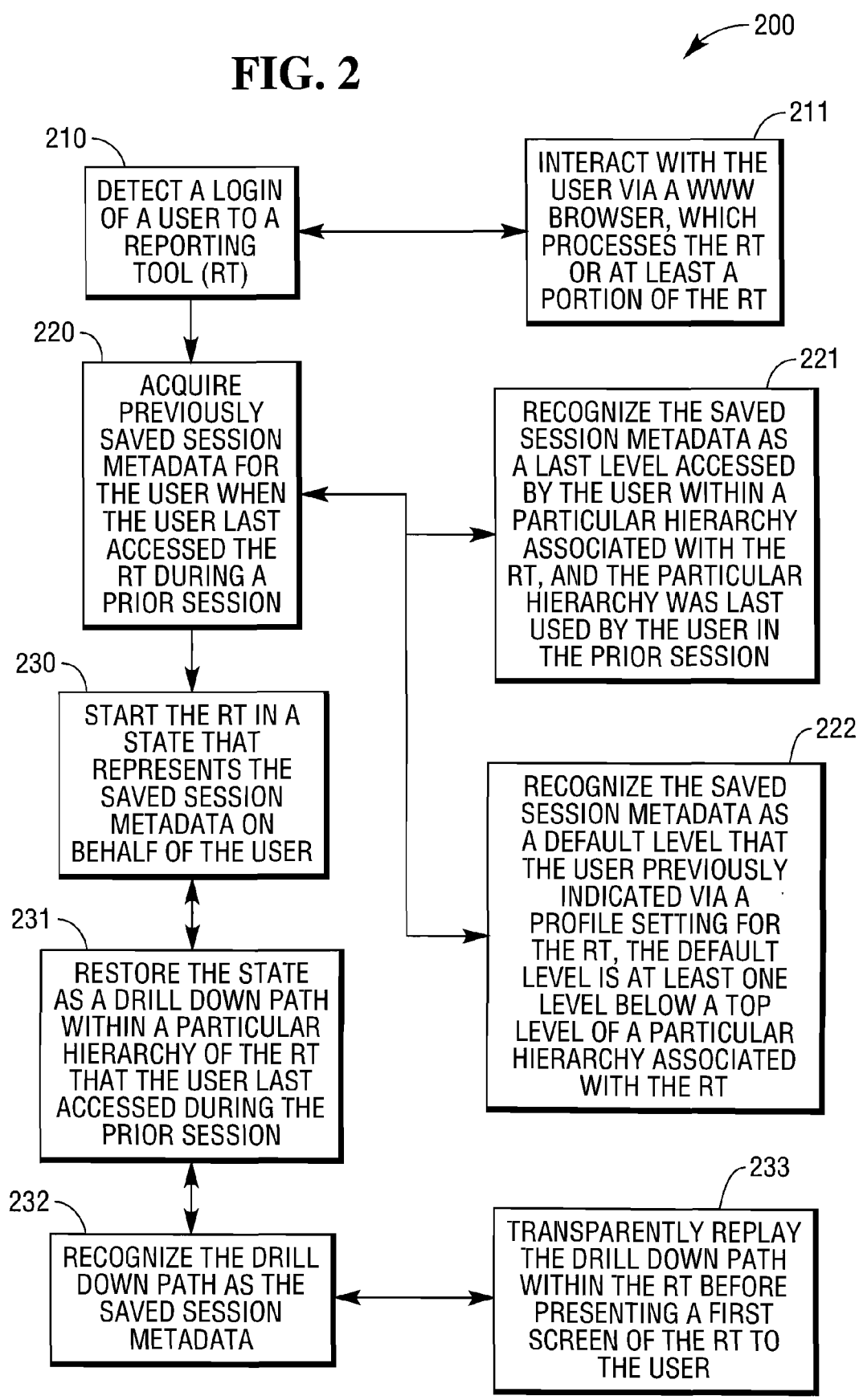
FIG. 2 is a diagram of another method for session management of a hierarchical reporting tool, according to an example embodiment.

FIG. 2 is a diagram of method 200 for session management of a hierarchical reporting tool, such as a fraud case defined by the processing depicted in FIG. 1, according to an example embodiment. The method 200 (hereinafter referred to as "report tool session restoring service") is implemented in a machine-accessible and computer-readable storage medium as instructions that when processed by a machine (computer or processor-enabled device) performs the processing depicted in the FIG. 1. The report tool session restoring service is also operational over a network and that network may be wired, wireless, or a combination of wired and wireless.

Although the report tool session manager (represented by the method 100 of the FIG. 1) provides a primary focus associated with capturing session data for a session that is exited by a user, the report tool session restoring service provides a primary focus associated with restoring a reporting tool to a saved session state that was recorded by the report tool session manager. So, the methods 100 and 200 provide different perspectives of a same tool or service and in this manner the report tool session restoring service is an enhanced perspective of the report tool session manager.

At 210, the report tool session restoring service detects a login of a user to a reporting tool. It is noted that the user may actually log in to a secure set of services, such as a data warehouse or even an enterprise network and not log directly into the reporting tool. Although, the user in some cases can log directly into the reporting tool, if policy requires such a login. Once a user authenticates an identity associated with the user, a security role, security access rights, policies, and/or profiles for the user can be obtained via an enterprise security system. So, detection can be made by the report tool session restoring service as soon as the user attempts to access the reporting tool and even if the user is already authenticated, the report tool session restoring service can treat this as a logical login to the report tool session restoring service and acquire the security identity and information associated with the user.

According to an embodiment, at 211, the report tool session restoring service interacts with the user via a WWW browser, which processes the reporting tool or at least a portion of the reporting tool. That is, the reporting tool itself may be independent of the WWW browser and may have plugin interfaces or modules that communicate with the reporting tool. So, in this sense the WWW browser may just process a portion of the reporting tool. Although, in some cases the entire reporting tool may be implemented and processed within a WWW browser.

At 220, the report tool session restoring service acquires previously saved session metadata for the user. This metadata represents information for when the user last or most recently accessed the reporting tool during a prior session with that reporting tool.

In an embodiment, the report tool session restoring service recognizes the saved session metadata as a last level accessed by the user within a particular hierarchy associated with a particular report that the user was processing within the reporting tool during the prior session with the reporting tool. So, the particular hierarchy is one that was last used by the user in the prior session.

In a particular situation, the report tool session restoring service recognizes the saved session metadata as a default level that the user previously indicated via a profile setting for the reporting tool. Again, the default level is at least one level below a top level for a particular hierarchy of a particular report. Thus, the report tool session restoring service can always use and maintain the same saved session metadata. This can occur when the user, via a profile, indicates that the user always wants to startup session with the reporting tool at a particular desired level within a particular hierarchy of a particular report. So, the saved session data from a prior session can be overridden by a profile setting, such that it is always a default desired user level.

At 230, the report tool session restoring service starts the reporting tool in a state that represents the saved session metadata on behalf of the user.

According to an embodiment, at 231, the report tool session restoring service restores the state as a drill down path within a particular hierarchy of the reporting tool for a particular report, which the used last accessed during the prior session. So, the report tool session restoring service can save a unique nested hierarchy for each unique report that a user traverses.

Continuing with the embodiment at 231 and at 232, the report tool session restoring service recognizes the drill down path as the saved session metadata.

Still continuing with the embodiment at 232 and at 233, the report tool session restoring service transparently (in the background and not noticed or detected by the user) replays the drill down path within the reporting tool before presenting a first screen of the reporting tool the user. So, the previous state that the user was in during the prior session with the reporting tool is recreated and reprocessed (particular report re-generated) within the reporting tool in the background and what the user first sees is the desired results for the desired report at the desired level that the user was at in the prior session.

Figure 3:
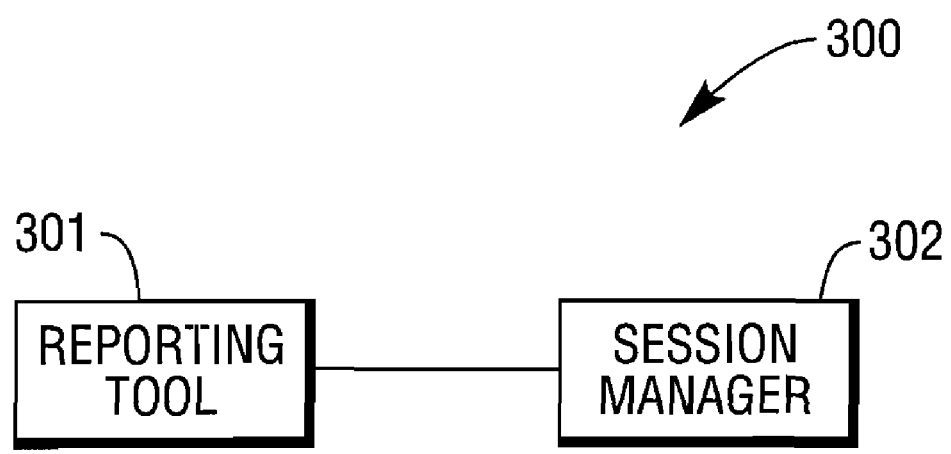
FIG. 3 is a diagram of a reporting tool session management system, according to an example embodiment.

FIG. 3 is a diagram of a reporting tool session management system 300, according to an example embodiment. The reporting tool session management system 300 is implemented as instructions within a machine-accessible or computer-readable medium that processes on one or more machines (computer(s) or processor-enabled device(s)) over a network. The network is wired, wireless, and/or wired and wireless. The reporting tool session management system 300 implements, among other things, the methods 100 and 200 of the FIGS. 1 and 2, respectively.

The reporting tool session management system 300 includes a reporting tool 301 and a session manager 302. Each of these and their interactions with one another will now be discussed in turn.

The reporting tool 301 is implemented in a computer-readable storage medium as instructions that process on one or more machines of the network. Example processing aspects of the reporting tool was presented above with respect to the methods 100 and 200 of the FIGS. 1 and 2, respectively. Additionally, example screenshots for an example scenario of the reporting tool 301 is presented by way of illustration below with reference to the FIGS. 4A-4F.

Initially, user interacts with the reporting tool 301 and navigates to a particular nested level during a session with the reporting tool 301 and then exits the reporting tool, which terminates the session.

According to an embodiment, the reporting tool is accessed via a WWW browser by the user. Moreover, a last hierarchy used and the nested level of the drill down path are saved by the session manager 302 (discussed below) as a cookie on a client of the user and reacquired by the session manager 302 with each of the subsequent sessions initiated by the user.

The session manager 302 is implemented in a computer-readable storage medium as instructions that process on the same or different machines (computer(s) or process-enabled device(s)) as that which process the reporting tool 301. Example processing details associated with the session manager 302 was presented above in detail with reference to the methods 100 and 200 of the FIGS. 1 and 2, respectively.

The session manager 302 saves the nested level as a drill down path to automatically recreate for the user within the reporting tool 301 when the user initiates subsequent sessions with the reporting tool 301. This drill down path is saved when the user exits the reporting tool 301 for each terminated session of the user with the reporting tool 301.

In an embodiment, the nested level is saved for a specific hierarchy of a specific report that was used within the reporting tool 301 when the user exits the reporting tool 301.

Also, the session manager 302 saves additional nested levels for the other subsequent session of the user within the reporting tool 301. Each additional nested level associated with a different hierarchy and a different report that processes within the reporting tool.

In another situation, the specific hierarchy is resolved by an identity associated with the user or a role assignment assigned to the user when the user authenticated to either the reporting tool 301 or to a network having the reporting tool 301.

In another case, the session manager 302 saves a specific drill down hierarchy for each report used by the user in the reporting tool 301. This is useful because drill down hierarchies can be different for reach report and the user may want the flexibility to save the drill down hierarchies on a report basis.

FIGS. 4A-4F are illustrative screen shots of a hierarchical reporting tool used by the session management techniques presented herein. It is noted that the screenshots are for one example and illustrated session of a user for a particular hierarchy being used by the user with a reporting tool. Other scenarios are possible and fall within the embodiments discussed herein above and below.

Figure 4A:
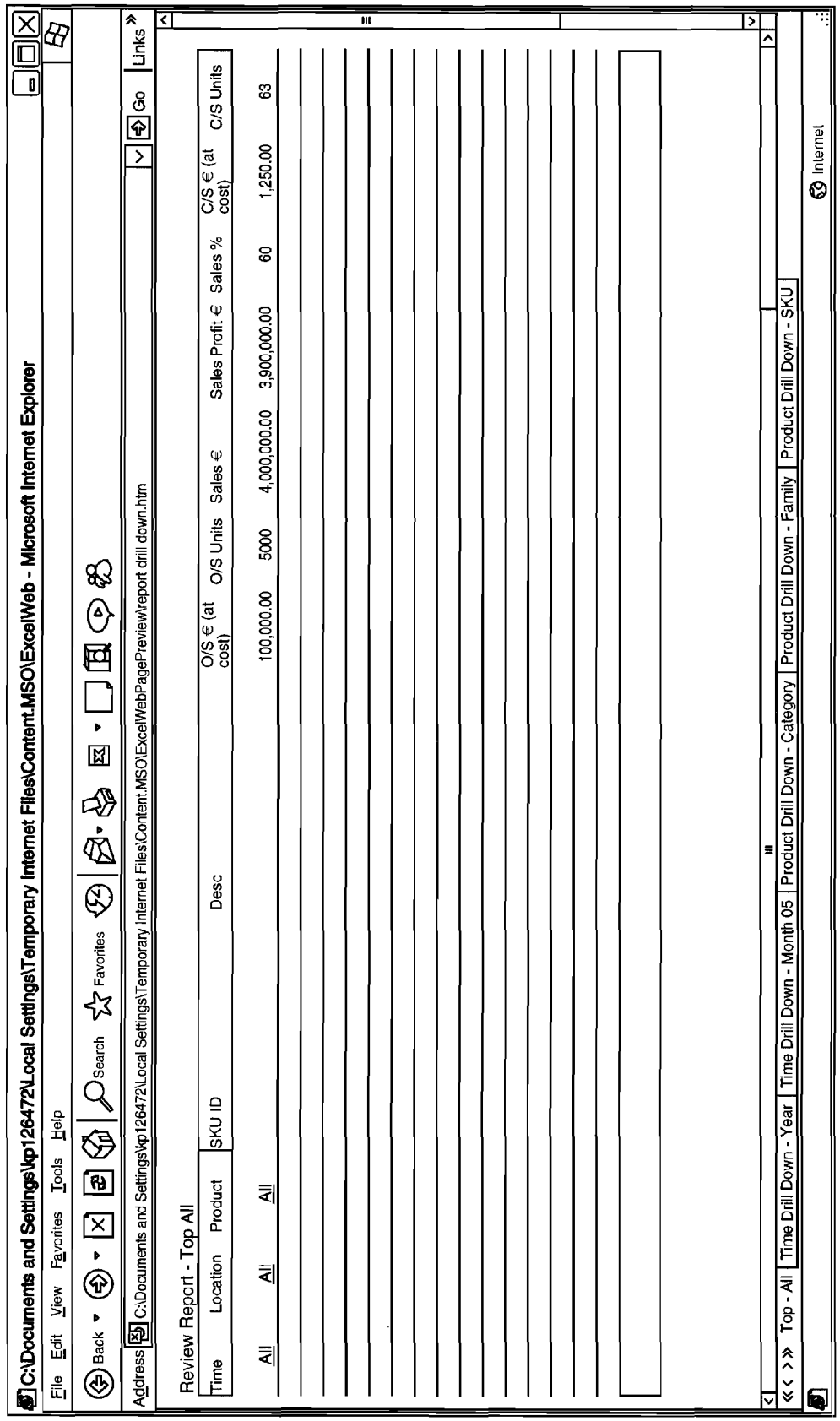

FIG. 4A a users first and initial interaction with a reporting tool (discussed herein). The hierarchy used can be automatically assigned based on the identity of the user or a role assigned to the user. The screenshots show a user that is classified or identified as a Senior Buyer/Category Manager for shoes, who accesses the tool for the first time. This manager can save a preferred saved session nested level such levels within the hierarchy as: month, country, product level, etc.

Again, FIG. 4A shows a first use by the manager that is opened to a default drill down nested level within the hierarchy for the manager within the reporting tool. This initial level is default level, perhaps associated with the user type (Senior Buyer/Category Manager for shoes). The manager continues to interact with the reporting tool by drilling down or rolling up to levels within the hierarchy loaded within the reporting tool for the initial and first manager session with the reporting tool. Each time the user changes the view of the report the drill down level is saved in the session metadata. So, the next or second and subsequent sessions started by the manager, the generated report is displayed at the saved nested level within the reporting tool. This is done on a per-user and per-hierarchy basis.

Figure 4B:
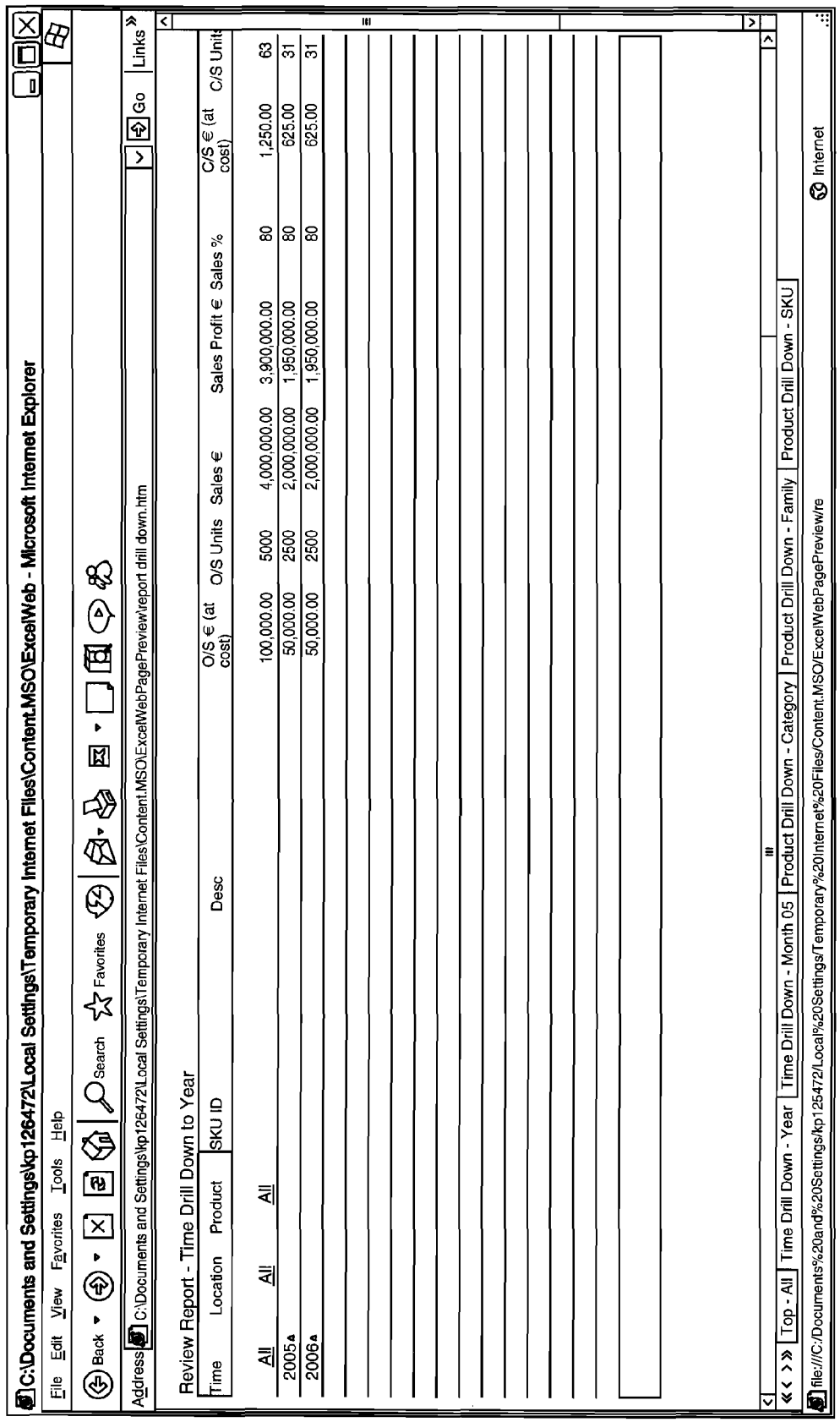
Figure 4E:
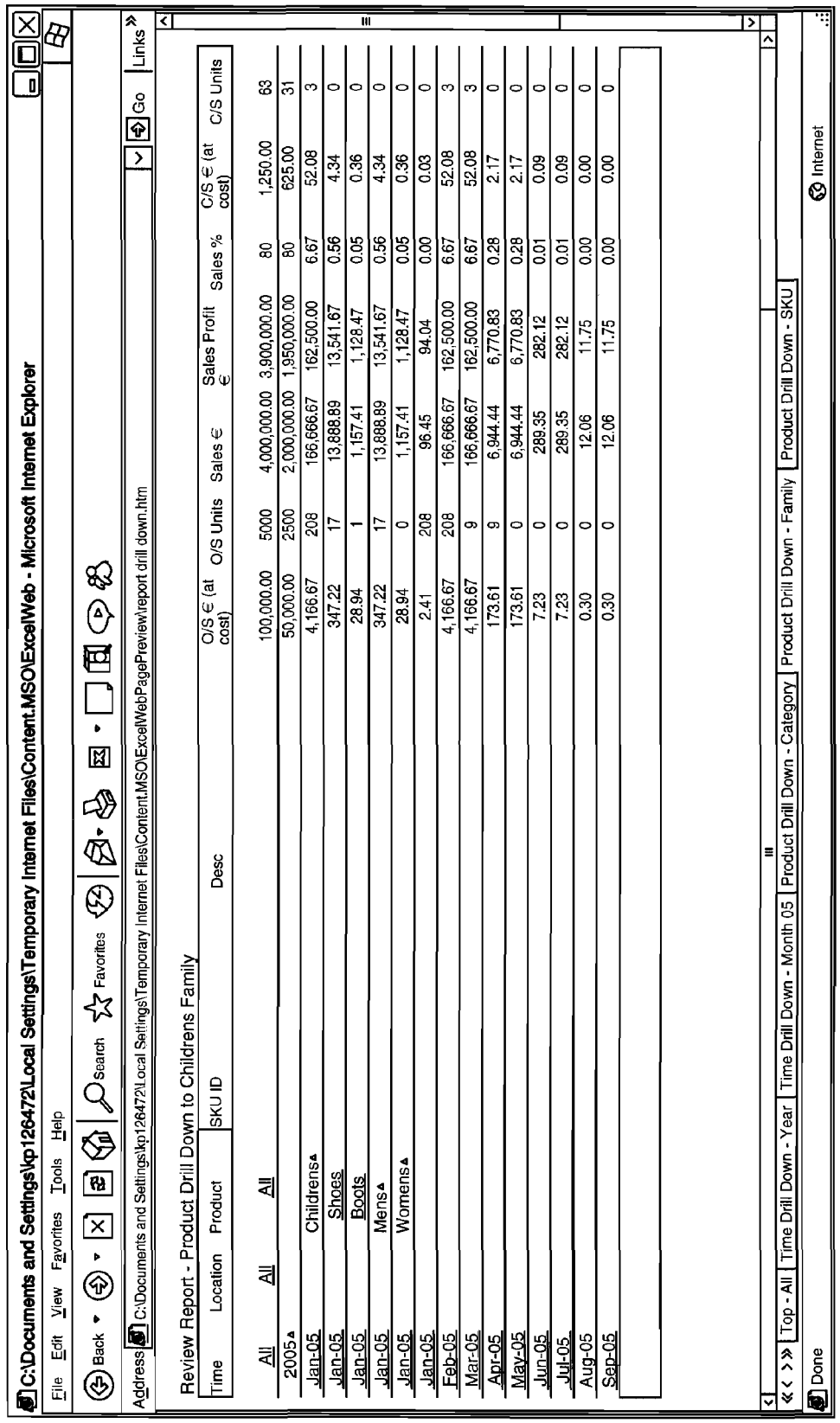

So, FIG. 4A shows a default level at first startup for the example hierarchy showing all sales. FIG. 4B shows a next level within the hierarchy for sales by year. FIG. 4C shows still another level within the hierarchy for sales by month of each year. FIG. 4D shows yet another level within the hierarchy for product categories, Children's, Men's, and Women's. FIG. 4E is a level deeper than FIG. 4D and shows shoe types (boots, shoes, etc.) within each product category for children shoes. FIG. 4F shows still a deeper level within the hierarchy for SKU's of specific shoe sales within each product category and each type of shot associated with children shoes.

Consider that FIG. 4F is the last drill down level within the hierarchy viewed by the manager. This metadata to subsequently recreate this level within the reporting tool for a next and subsequent session of the manager can be saved as metadata in tables, such as the ones listed below for purposes of illustration only.

| DrillDownLevel Table | | | | |
| --- | --- | --- | --- | --- |
| UserID | ReportID | TimeLevel | LocLevel | ProductLevel |
| user01 | report01 | month | all | sku |

| UserType Table | |
| --- | --- |
| UserID | UserType |
| user01 | childrencatmanager |

| ReportType Table | |
| --- | --- |
| ReportID | ReportType |
| report01 | reviewreport |

| DefaultDrillDown Table | | | | |
| --- | --- | --- | --- | --- |
| UserType | ReportType | TimeLevel | LocLevel | ProductLevel |
| Childrencatmanager | reviewreport | month | all | family |

The diagrams FIG. 4A-4F and the tables (above) are shown to give the reader an understanding of the drill down process and supporting metadata structures that can be used in an example scenario to achieve the teaches presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method implemented in a processor-enabled device in a non-transitory computer-readable storage medium, causing the processor-enabled device to perform the method, comprising:

providing, by the processor-enabled device, a reporting tool to a user the reporting tool having multiple levels within a hierarchy, each level within the hierarchy providing a different view of a data model for a data warehouse, the hierarchy is customized and interactively traversed by the user, the topmost level is a coarse grain view of a particular report as the user traverses down through the hierarchy, specific information that the user is after within the particular report is presented; and recording, by the processor-enabled device, a nested level reached by the user within the reporting tool when the user exits the reporting tool based on a profile setting for the user that indicates the nested level is to be recorded and reloaded automatically on next access by the user to the reporting tool, the profile is specific to the hierarchy and the user and the profile is stored as a cookie on a client device of the user, a particular profile setting allows for removal of all nested level recordation and shuts down features of saved nested level recovery, the nested level reached is a lowest level of the hierarchy traversed to by the user before the user exits, and this lowest level is restored on the next access by the user unless a certain profile setting indicates that a default desired user level is always to be restored thereby overriding the lowest level.

2. The method of claim 1, wherein providing further includes providing the reporting tool via a World-Wide Web (WWW) browser front-end interface to a backend data warehouse.

3. The method of claim 1, wherein providing further includes providing the reporting tool as a hierarchical reporting tool having the multiple levels, wherein the nested level is at least one level below a top level of a particular hierarchy loaded in the hierarchical reporting tool.

4. The method of claim 1, wherein recording further includes affirmatively asking the user via a popup interface window presented to the user whether to record the nested level based on the profile setting.

5. The method of claim 1, wherein recording further includes detecting an abnormal exit of the reporting tool when the user is detected as exiting the reporting tool.

6. The method of claim 1 further comprising, detecting, by the processor-enabled device, a subsequent session to the reporting tool made by the user and restoring the user to the nested level within the reporting tool upon startup of the reporting tool for that subsequent session.

7. A machine-implemented method implemented in a processor-enabled device in a non-transitory computer-readable storage medium, causing the processor-enabled device to perform the method, comprising:

detecting, by the processor-enabled device, a login of a user to a reporting tool;

acquiring, by the processor-enabled device, previously saved session metadata for the user when the user last accessed the reporting tool during a prior session; and starting, by the processor-enabled device, the reporting tool in a state that represents the saved session metadata on behalf of the user, the reporting tool having multiple levels within a hierarchy, each level within the hierarchy providing a different view of a data model for a data warehouse and the previously saved session metadata was saved based on a profile setting that is specific to the hierarchy and the user and recalled on the login of the user from a cookie stored on a client device of the user, the saved session metadata specific to the user and the hierarchy and a particular profile setting can override restoration of the saved session metadata to a desired user level within the hierarchy always presented to the user when accessing the hierarchy.

8. The method of claim 7, wherein detecting further includes interacting with the user via a World-Wide Web (WWW) browser, which processes the reporting tool or at least a portion of the reporting tool.

9. The method of claim 7, wherein acquiring further includes recognizing the saved session metadata as a last level accessed by the user within a particular hierarchy associated with the reporting tool, and the particular hierarchy was last used by the user in the prior session.

10. The method of claim 7, wherein starting further includes restoring the state as a drill down path within a particular hierarchy of the reporting tool that the user last accessed during the prior session.

11. The method of claim 10, wherein restoring further includes recognizing the drill down path as the saved session metadata.

12. The method of claim 11, wherein restoring further includes transparently replaying the drill down path within the reporting tool before presenting a first screen of the reporting tool to the user.

\* \* \* \* \*